US009959526B2

(12) United States Patent
Kuhlke et al.

(10) Patent No.: US 9,959,526 B2
(45) Date of Patent: May 1, 2018

(54) METHOD AND APPARATUS FOR INCORPORATING USER INTERACTION BASED PRESENCE IN EMAIL SYSTEMS

(75) Inventors: Matthew Kuhlke, San Francisco, CA (US); Ethan Hugg, Seattle, WA (US); Eric Heng Chih Lee, Cerritos, CA (US); Chin-Ju Chen, Cerritos, CA (US)

(73) Assignee: Cisco Technology, Inc., San Jose, CA (US)

(*) Notice: Subject to any disclaimer, the term of this patent is extended or adjusted under 35 U.S.C. 154(b) by 2503 days.

(21) Appl. No.: 12/272,959

(22) Filed: Nov. 18, 2008

(65) Prior Publication Data
US 2010/0125636 A1    May 20, 2010

(51) Int. Cl.
*G06F 15/16*        (2006.01)
*G06Q 10/10*        (2012.01)
*H04L 12/58*        (2006.01)

(52) U.S. Cl.
CPC ......... *G06Q 10/107* (2013.01); *H04L 51/043* (2013.01); *H04L 51/18* (2013.01); *H04L 51/34* (2013.01)

(58) Field of Classification Search
USPC ........................................................ 709/206
See application file for complete search history.

(56) References Cited

U.S. PATENT DOCUMENTS

| | | | | |
|---|---|---|---|---|
| 5,944,786 A * | 8/1999 | Quinn | .................... | H04L 12/587 379/88.12 |
| 6,501,834 B1 * | 12/2002 | Milewski | ................. | H04L 51/36 379/88.17 |
| 6,839,737 B1 * | 1/2005 | Friskel | ................. | G06Q 10/107 707/999.01 |
| 7,100,166 B2 * | 8/2006 | Takatama et al. | ............ | 719/318 |
| 7,222,156 B2 * | 5/2007 | Gupta et al. | ................... | 709/206 |
| 7,359,947 B2 * | 4/2008 | Kelley et al. | ................. | 709/206 |
| 8,005,907 B2 * | 8/2011 | Haynes | ................ | G06Q 10/107 709/204 |
| 8,379,832 B1 * | 2/2013 | Lyman | ................ | H04M 3/5141 379/265.04 |
| 8,667,070 B2 * | 3/2014 | Uchiyama | ............. | G06Q 10/00 709/203 |
| 8,849,918 B2 * | 9/2014 | Drouet | ................. | G06Q 10/107 707/778 |
| 9,401,812 B1 * | 7/2016 | Jachner | ................... | H04L 12/18 |
| 2002/0065894 A1 * | 5/2002 | Dalal et al. | .................... | 709/206 |
| 2002/0112006 A1 * | 8/2002 | Kuriki | ................. | G06Q 10/107 709/206 |
| 2002/0147777 A1 * | 10/2002 | Hackbarth et al. | ........... | 709/205 |
| 2003/0055902 A1 * | 3/2003 | Amir | ....................... | H04L 51/14 709/206 |
| 2003/0061176 A1 * | 3/2003 | Hoar | ............................. | 705/402 |
| 2003/0158855 A1 * | 8/2003 | Farnham | ............... | G06F 3/0481 |

(Continued)

*Primary Examiner* — Ario Etienne
*Assistant Examiner* — Blake Rubin
(74) *Attorney, Agent, or Firm* — P.Su

(57) ABSTRACT

In one embodiment, an apparatus includes a network arrangement and an email arrangement. The network arrangement is configured to enable the apparatus to communicate across a network. The email arrangement cooperates with the network arrangement to send and to receive emails. The email arrangement includes presence logic that monitors user interaction based presence with respect to a first email.

11 Claims, 5 Drawing Sheets

(56) References Cited

U.S. PATENT DOCUMENTS

| | | | |
|---|---|---|---|
| 2004/0120316 A1* | 6/2004 | McCormack | H04L 29/06027 370/392 |
| 2004/0249900 A1* | 12/2004 | Karstens | H04L 12/581 709/207 |
| 2005/0021645 A1* | 1/2005 | Kulkarni | G06Q 10/107 709/206 |
| 2005/0080863 A1* | 4/2005 | Daniell | G06Q 10/107 709/206 |
| 2005/0084082 A1* | 4/2005 | Horvitz et al. | 379/114.06 |
| 2005/0198511 A1* | 9/2005 | Tomkow | H04L 51/30 713/176 |
| 2005/0251555 A1* | 11/2005 | Little, II | H04L 12/5815 709/206 |
| 2006/0041626 A1* | 2/2006 | Chen | H04L 51/34 709/206 |
| 2006/0072721 A1* | 4/2006 | Wisniewski | G06F 17/30905 379/88.22 |
| 2006/0101119 A1* | 5/2006 | Qureshi | G06Q 10/107 709/206 |
| 2006/0168026 A1* | 7/2006 | Keohane et al. | 709/206 |
| 2007/0081640 A1* | 4/2007 | Jachner | H04M 3/53366 379/88.16 |
| 2007/0116195 A1* | 5/2007 | Thompson | H04L 12/58 379/67.1 |
| 2007/0214216 A1* | 9/2007 | Carrer et al. | 709/204 |
| 2008/0046525 A1* | 2/2008 | Ito | G06Q 10/10 709/206 |
| 2008/0114838 A1* | 5/2008 | Taylor | 709/206 |
| 2008/0208984 A1* | 8/2008 | Rosenberg | G06Q 10/107 709/206 |
| 2009/0094340 A1* | 4/2009 | Gillai | G06F 15/16 709/206 |
| 2009/0182824 A1* | 7/2009 | Haynes | H04L 51/16 709/206 |
| 2009/0198785 A1* | 8/2009 | Uchiyama | G06Q 10/00 709/206 |
| 2009/0213435 A1* | 8/2009 | Cohen | H04L 12/5855 358/402 |
| 2009/0248806 A1* | 10/2009 | Teman | G06Q 30/02 709/206 |
| 2009/0262668 A1* | 10/2009 | Hemar | G06Q 30/02 370/260 |
| 2009/0299934 A1* | 12/2009 | Horvitz et al. | 706/45 |
| 2009/0313554 A1* | 12/2009 | Haynes | G06Q 10/107 715/752 |
| 2010/0077317 A1* | 3/2010 | Kritt | G06Q 10/107 715/752 |
| 2013/0227034 A1* | 8/2013 | Jiang | H04L 51/043 709/206 |

* cited by examiner

METHOD AND APPARATUS FOR INCORPORATING USER INTERACTION BASED PRESENCE IN EMAIL SYSTEMS

BACKGROUND OF THE INVENTION

The present invention relates generally to communications systems.

Electronic mail, or email, is a medium often used by knowledge workers to exchange or otherwise share information. By way of example, a knowledge worker may send an email to a group of users to solicit information he needs to perform a task. The knowledge worker may receive the solicited information from one or more of the users. If the one or more users respond such that only one response to an original email is provided at a time, then a response chain associated with the original email is substantially linear.

However, if more than one user who receives an email separately responds to the email at substantially the same time, then the response chain associated with the email loses its linearity. When multiple users generate separate responses to the same email at approximately the same time, confusion may result as users are unaware that other users are also responding to the email.

BRIEF DESCRIPTION OF THE DRAWINGS

The invention will be readily understood by the following detailed description in conjunction with the accompanying drawings, wherein like reference numerals designate like structural elements, and in which.

DESCRIPTION OF EXAMPLE EMBODIMENTS

General Overview

Figure 1:
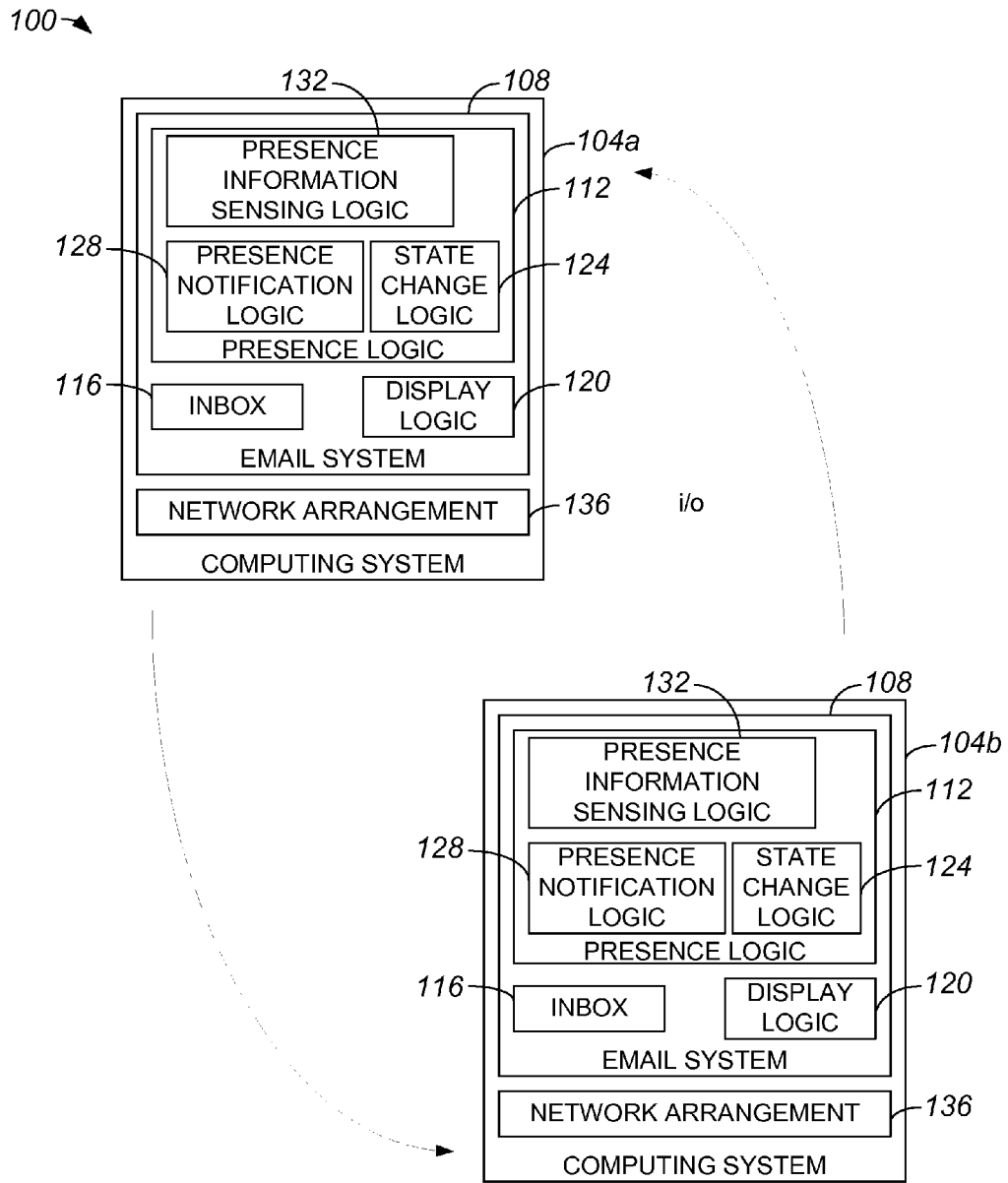
FIG. 1 is a block diagram representation of an enterprise in which email clients support user interaction based presence in accordance with an embodiment of the present invention.

According to one aspect of the present invention, an apparatus includes a network arrangement and an email arrangement. The network arrangement is configured to enable the apparatus to communicate across a network. The email arrangement cooperates with the network arrangement to send and to receive emails. The email arrangement includes presence logic that monitors user interaction based presence with respect to a first email.

Description

Allowing an author of an email to identify how much a recipient of the email has relatively meaningfully interacted with the email, and to determine whether a reply or response to the email is forthcoming, enhances the ability of the author to efficiently utilize email as a communications tool. An author or originator of an email may receive updates which indicate whether a recipient of the email has opened an email, how much of the email the recipient has likely read, whether the recipient has begun to craft a response to the email, whether the recipient has saved a potential response as a draft, and whether the recipient has aborted the preparation of a response. Such updates enable the author to determine whether the email was likely read by the recipient, and to anticipate when he may possibly receive a response. When such updates are provided to substantially all recipients of an email, the various recipients may determine whether other recipients are responding to an email, and plan their own responses accordingly.

By providing knowledge workers who use email, or email users, with information regarding email-based interactions or email-based presence information, the knowledge workers are able to track identify who has read an email and who is preparing a response to an email. Hence, an email response chain may be more likely to maintain linearity, as simultaneous responses may be avoided if users are aware of other users who are about to respond to an email. If a user is able to anticipate when another user is about to respond to an email, he may wait until the other user responds before responding himself.

Aggregating or otherwise collecting relevant email-based interaction information or, more generally, presence information, allows users to efficiently utilize email as a communications tool. For example, if a sender of an email is provided with information which indicates that a recipient of the email is in the process of preparing a response, the sender may elect to remain at his computer in anticipation of receiving the response. Additionally, if a sender of an email is provided with information which indicates that a recipient is currently reading through the email, the sender may be confident that the information he wished to provide to the recipient is being decimated.

Once information regarding email-based interactions is aggregated or otherwise collected, the information may be published. For example, once an email client of a user who sent an original email collects information regarding interactions with the original email, the email client may render and present the user with a representation of the current activity surrounding the email. The user may then be able to view which recipients of the email have opened the email, how much of the email the recipients have read, which recipients have replied or are replying to the email, and/or which recipients have saved drafts of replies to the email. In one embodiment, each recipient of the email may also be able to view the current activity surrounding the email.

By way of example, a recipient of an email may view information regarding the active presence of those related to the email. Those related to the email generally include the originator of the email and other recipients of the email. The information may indicate whether the other recipients are currently reading the email, in the process of preparing or authoring a response to the email, or not actively interacting with the email.

Referring initially to FIG. 1, a system which includes email clients that support user interaction based presence will be described in accordance with an embodiment of the present invention. A system 100, or an enterprise, includes a plurality of computing systems 104a, 104b that are each arranged to support email systems 108 which provide an author of an email, or an originator of an email, with information regarding how much an email recipient has interacted with the email, as well as information regarding whether a response may be expected.

Each computing system 104a, 104b includes a network arrangement 136 which allows computing systems 104a, 104b to communicate with each other, as well as with other computing systems (not shown). Network arrangements 136 may include hardware, e.g., input/output ports, and/or software logic that allows computing systems 104a, 104b to communicate.

Each email system 108 generally includes an inbox 116, presence logic 112, and display logic 120. Inbox 116 is arranged to contain received email. Email that is newly received is typically routed into and essentially managed by inbox 116. Presence logic 112 includes state change logic 124, presence notification logic 128, and presence information sensing logic 132. Display logic 120 allows information regarding current activity relating to an email to be displayed such that a user may view a history, e.g., a thread, associated with the email. In other words, display logic 120 allows windows to be opened and maintained to display presence information relating to an email. Typically, the presence information is associated with the status of a response to the email, or a reply status.

State change logic 124 is arranged to detect when a state change has occurred with respect to an email received in inbox 116. State changes may correspond to actions taken with respect to an email. In general, state changes may include, but are not limited to including, an act of opening an email, an act of reading an email, an act of beginning a reply to the email, an act of saving a draft to a reply, an act of aborting a reply, and an act of closing an email. State change logic 124 may detect state changes by monitoring the activities of a user with respect to an email. By way of example, monitoring what parts of an email is displayed on a display (not shown) associated with computing system 104a allows state change logic 124 to ascertain which parts of the email are likely being read.

Presence notification logic 128 is arranged to generate and to provide notifications regarding state changes associated with an email. In one embodiment, presence notification logic 128 may generate a message, which may be provided from one computing system 104a, 104b to another computing system 104a, 104b, which is identified as containing a presence notification. For example, such a message may include a presence line type that effectively indicates that the message is to be processed as a presence notification and not as a standard email message.

Presence information sensing logic 132 is arranged to identify when a presence notification is received. Such an identification may be made by detecting a presence line type in a received message. Upon identifying a presence notification, presence information sensing logic may process the presence notification. Processing the presence notification may include, but is not limited to including, preventing the presence notification from being placed in inbox 116, and identifying information relating to the current activity associated with an email. Presence information sensing logic 132 may cooperate with display logic to present, e.g., to display, the information relating to the current activity associated with the email.

Figure 2:
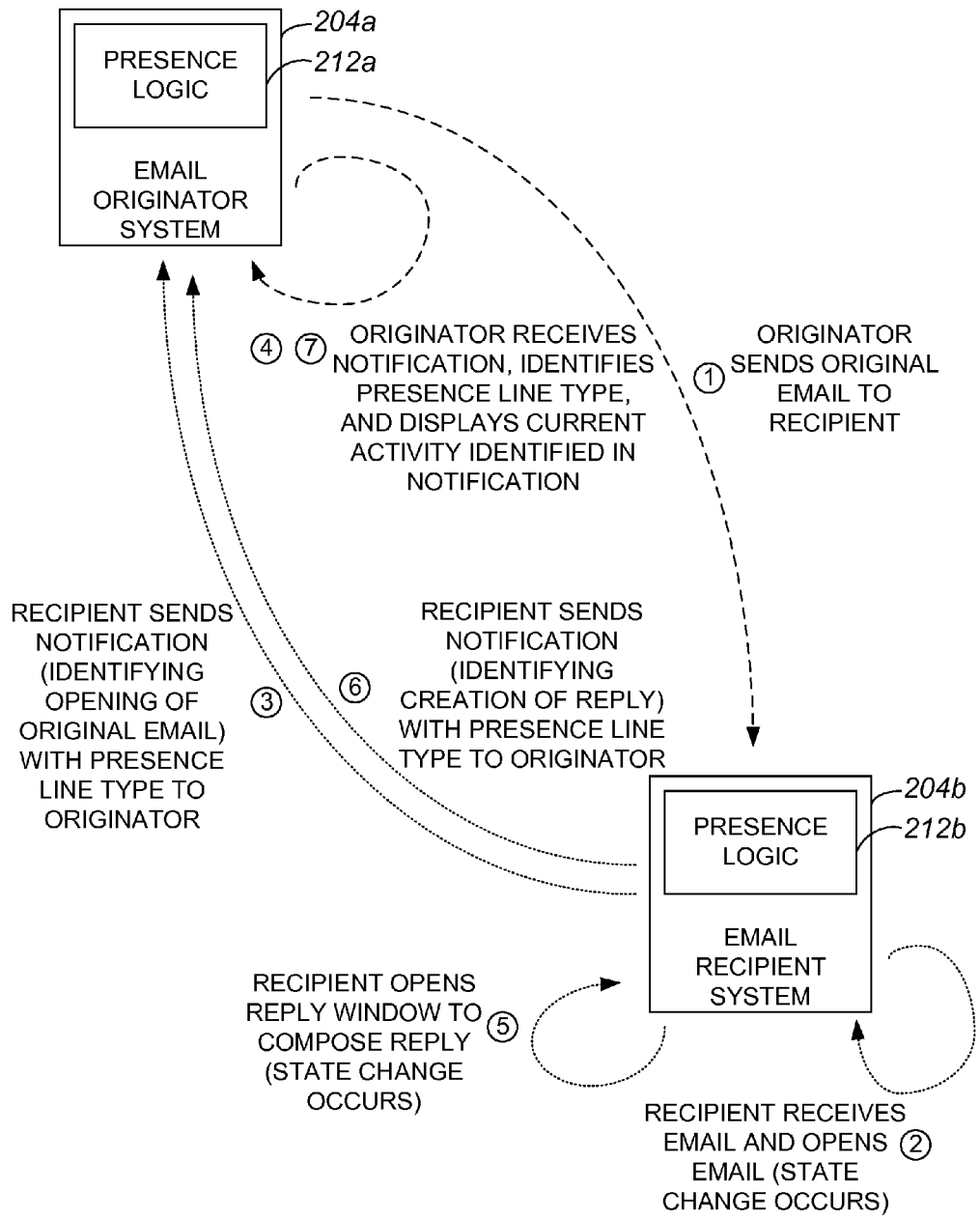
FIG. 2 is a diagrammatic representation of a process of obtaining and presenting information regarding the current activity associated with an email in accordance with an embodiment of the present invention.

Various interactions generally occur between an email originator, e.g., a system which sends a first email in an email chain, and an email receiver, e.g., a system which receives the first email. With reference to FIG. 2, interactions associated with a process of obtaining and presenting information regarding the current activity associated with an email will be described in accordance with an embodiment of the present invention. An email originator 204a which includes presence logic 212a is configured to provide communications to and obtain communications from an email recipient 204b which includes presence logic 212b. Email originator 204a sends an initial email which is received or otherwise obtained by email recipient 204b.

Upon receiving the initial email, email recipient 204b opens the initial email. Opening the initial email involves a change in a state associated with the initial email. In the described embodiment, a state change effectively triggers a notification to email originator 204a. As such, email recipient 204b sends a notification to email originator 204a which contains an indication that email recipient 204b has opened the initial email. Such a notification includes a presence line type which is configured to be recognized by presence logic 212a as being associated with presence information. The presence line type indicates to email originator 204a that the notification, while provided to email originator through email channels, is not to be processed as an email and, instead, is to be processed as information to be rendered in a display of activity information. By way of example, rather than being routed into an inbox, the notification may be queued to be rendered in a display associated with email originator 204a.

It should be appreciated that the notification which contains an indication that email recipient 204b may generally be sent to substantially all recipients of the original email. In other words, if email originator 204a sent the original email to a plurality of recipients, the notification sent by email recipient 204b in response to a state change associated with the original email may be provided to each of the recipients of the original email.

When email originator 204a receives or otherwise obtains the notification which indicates that the original email has been opened, email originator 204a identifies the presence line type, and processes the notification accordingly. Processing the notification accordingly may include, but is not limited to including, displaying the indication of the current activity of email recipient 204b, which is contained in the notification, and displaying the current time, on email originator 204b.

After email recipient 204b receives and opens the original email, email recipient 204b opens a reply window to compose a reply to the original email, i.e., a response email. In the described embodiment, while email recipient 204b opens a reply window, it should be understood that email recipient 204b may instead perform other actions with respect to the original email. When the reply window is opened, a state change effectively occurs with respect to the original email. Hence, in order to notify email originator 204a of the state change, e.g., that email recipient 204 is in the process of composing a reply to the original email, email recipient 204b sends a notification to email originator 204a. The notification indicates a presence line type, in addition to indicating that email recipient 204b has begun to compose a reply to the original email. It should be appreciated that in addition to providing the notification to email originator 204a, email recipient 204b may also provide the notification to substantially all recipients of the original email.

When email originator 204a obtains the notification which indicates that email recipient 204b has begun to compose a reply to the original email, email originator 204a identifies the presence line type associated with the notification, and displays the current activity of email recipient 204b relative to the original email. As the current activity is the composition of a reply, an indication that email recipient 204*b* has begun to compose a reply may be displayed by email originator 204*a*.

Figure 3:
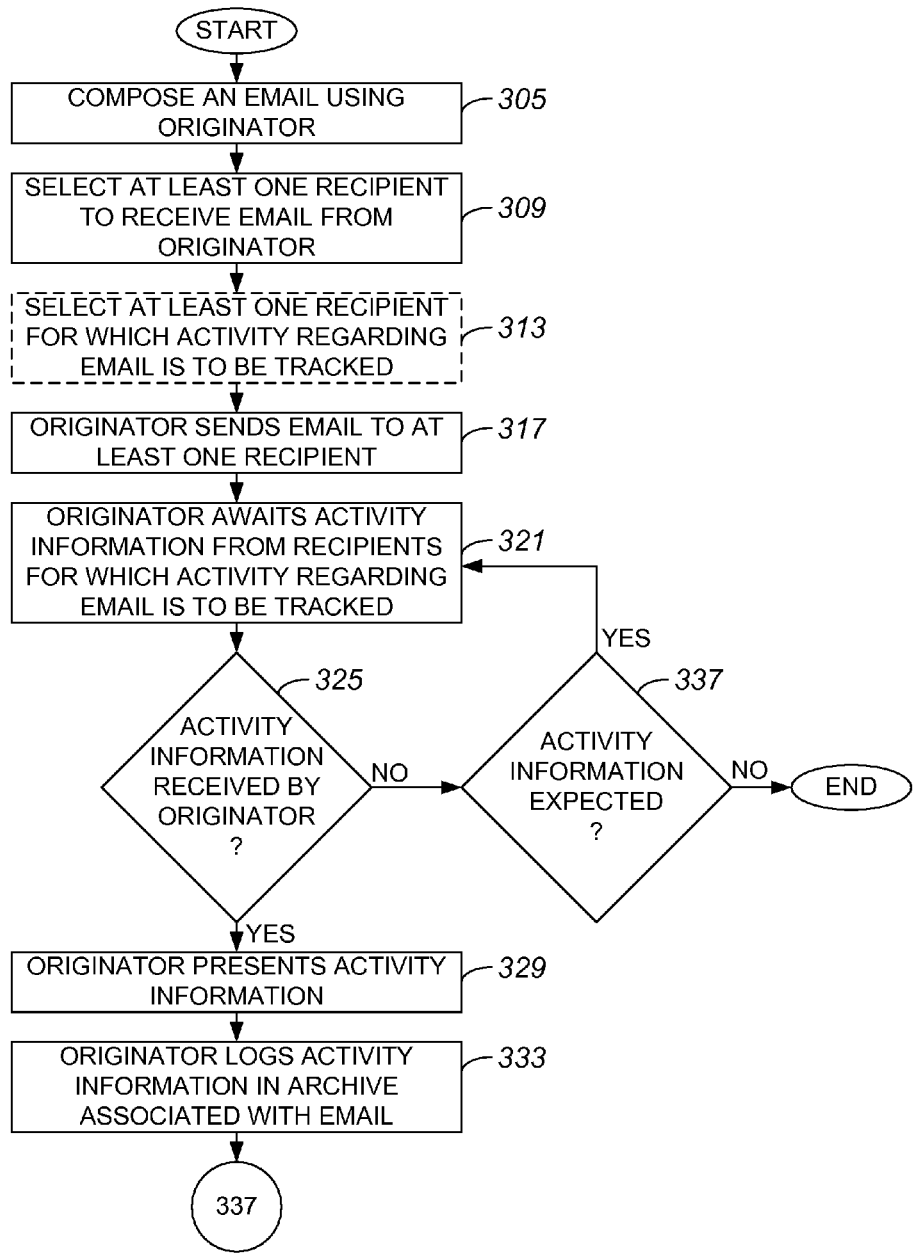
FIG. 3 is a process flow diagram which illustrates one method of monitoring activity associated with an email from the point-of-view of an originator of the email in accordance with an embodiment of the present invention.

An email originator may generally keep track of activities associated with an email originated by the email originator. That is, the activity of recipients of an email originated by the email originator may effectively be monitored. FIG. 3 is a process flow diagram which illustrates one method of monitoring activity associated with an email, or email based interactions, from the point-of-view of an originator of the email in accordance with an embodiment of the present invention. A process 301 of monitoring activity associated with an email begins at step 305 in which an email is composed, e.g., by a knowledge worker or a user, using an email originator. The email originator may generally be a computing system which supports an email application.

After the email is composed, a user may select or otherwise identify at least one recipient to receive the email in step 309. Selecting at least one recipient typically includes populating or filling in a "to" field associated with the email. The selected recipients may be within the same enterprise as the email originator, and/or may be external to the enterprise. In one embodiment, if more than one recipient is selected, the user may select specific recipients in step 313 for which activity regarding the email is to be tracked. That is, a user may optionally limit the number of recipients for which activity regarding the email is to be tracked such that the activity of less than all of the recipients is tracked. It should be appreciated, however, that if the optional step of selecting recipients for which activity regarding the email is to be tracked, the activity of substantially all recipients may substantially automatically be tracked.

In step 317, the email is sent by the email originator to each identified recipient. Once the email is sent, the email originator awaits activity information in step 321 from each recipient for which activity regarding the email is to be tracked. That is, the email originator awaits the receipt of at least one presence notification which contains activity information.

A determination is made in step 325 as to whether the email originator has received any activity information, e.g., an indication of a state change associated with the email. Such a determination may include identifying a communication from a recipient that contains a presence line type. It should be appreciated that such a communication may not always be provided by a recipient. If it is determined that the email originator has received activity information in a notification, then the email originator prevents the notification from being provided to an inbox, and presents the activity information in step 329. Presenting the activity information may include rendering the activity information into a format that may be displayed by and on the email originator. The activity information may be presented in any suitable format including, but not limited to including, textual, audio, and/or graphical formats.

After the activity information is presented by the email originator, the email originator logs the activity information in an archive associated with the email in step 333. In other words, a chain associated with the email is updated based on the activity information presented in step 329. From step 333, process flow proceeds to step 337 in which it is determined if additional activity information is expected. Additional activity information may be expected if not all recipients for which activity is to be tracked have already provided activity information, or if actual replies to the email have already been received. If additional activity information is not expected, the process of monitoring activity associated with an email is completed. Alternatively, if it is determined in step 337 that additional activity information may be expected, then process flow returns to step 321 in which the originator awaits activity information from recipients for which activity regarding the email is to be tracked.

Returning to step 325, if the determination is that activity information has not been received by the email originator, the indication may be that the recipients for which activity is to be tracked have not yet viewed the email, or that no activity information is expected. Accordingly, process flow moves from step 325 to step 337 in which it is determined if activity information is expected.

Figure 4:
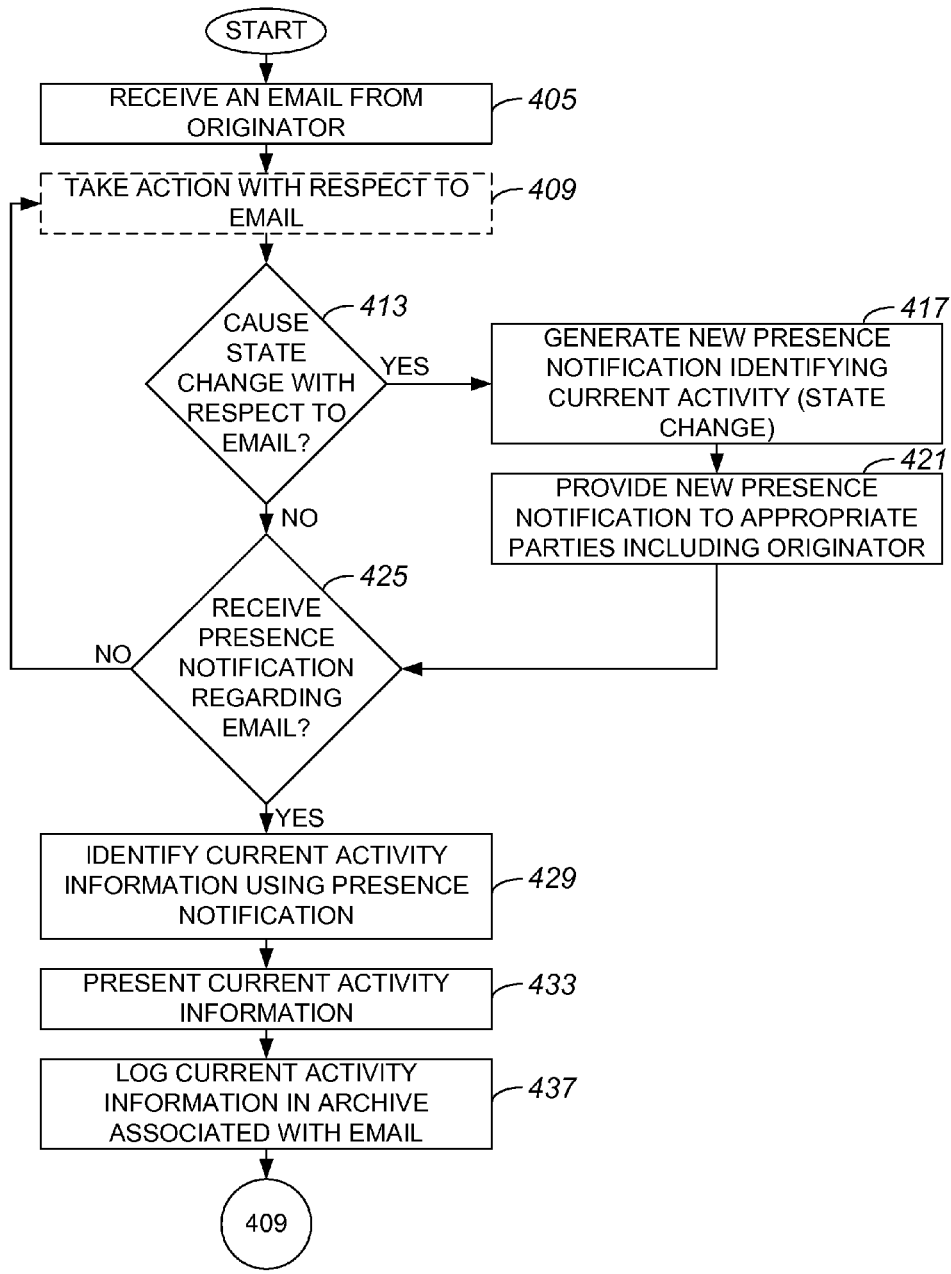
FIG. 4 is a process flow diagram which illustrates one method of monitoring activity associated with an email from the point-of-view of a recipient of the email in accordance with an embodiment of the present invention.

A recipient who receives an email may take actions relating to the email, and may provide notifications regarding the actions to the originator of the email and to other recipients of the email. Such a recipient may also receive notifications regarding the actions of other recipients. FIG. 4 is a process flow diagram which illustrates one method of monitoring activity associated with an email from the point-of-view of a recipient of the email in accordance with an embodiment of the present invention. A process 401 of monitoring activity associated with an email from the point-of-view of a recipient of the email begins at step 405 in which a recipient receives an email from an originator. Upon receiving the email, the recipient may optionally take an action with respect to the email in step 409. An action may generally include, but is not limited to including, opening the email, forwarding the email to another party, reading the email, creating a draft response to the email, and replying to the email. It should be appreciated that the recipient need not take any action with respect to the email, e.g., the recipient may leave the email unopened and unread in an inbox.

A determination is made in step 413 as to whether the recipient has effectively caused a state change with respect to the email. As previously mentioned, a state change may be associated with substantially any action or activity relating to the email. If the determination is that no state change has been caused by the recipient, process flow moves to step 425 in which it is determined whether the recipient has received or otherwise obtained a presence notification associated with the email. Such a determination may generally include identifying a presence notification.

If it is determined that no presence notification regarding the email has been received or otherwise obtained, process flow returns to step 409 in which the recipient may take an action with respect to the email. Alternatively, if it is determined that the recipient has received or otherwise obtained a presence notification associated with the email, then the recipient identifies the current activity information substantially contained in the presence notification in step 429. The current activity information may identify a party, e.g., another recipient or the originator, that is currently taking an action with respect to the email. In other words, the current activity information may identify a user interaction with the email.

After current activity information is identified, the current activity information is effectively presented in step 433. By way of example, the current activity information may be rendered and displayed on a display screen of the recipient such that a history of substantially all activity pertaining to the email may be viewed. Once the current activity information is effectively presented, the current activity information may be logged in step 437 in an archive associated with the email. Then, process flow returns to step 409 in which the recipient may take an action with respect to the email.

Returning to step 413, if it is determined that the recipient has caused a state change with respect to the email, the implication is that the recipient is currently performing an action with respect to the email. Accordingly, in step 417, the recipient generates a presence notification which identifies the current activity or, more generally, a state change. Once the presence notification is generated, the presence notification is provided to at least the originator in step 421. In general, the presence notification is provided to the originator and each recipient of the email received in step 405. After the presence notification is provided to appropriate parties, process flow moves to step 425 in which the recipient determines whether a presence notification regarding the email has been received.

Often, an originator may send an email to a distribution list that includes multiple recipients. When each of the multiple recipients receives the email, each recipient may interact with the email and, hence, effectively cause activity updates or user interaction based presence information to be created. An activity update associated with one of the recipients may be sent to other recipients included in the distribution list, in addition to the originator.

Figure 5:
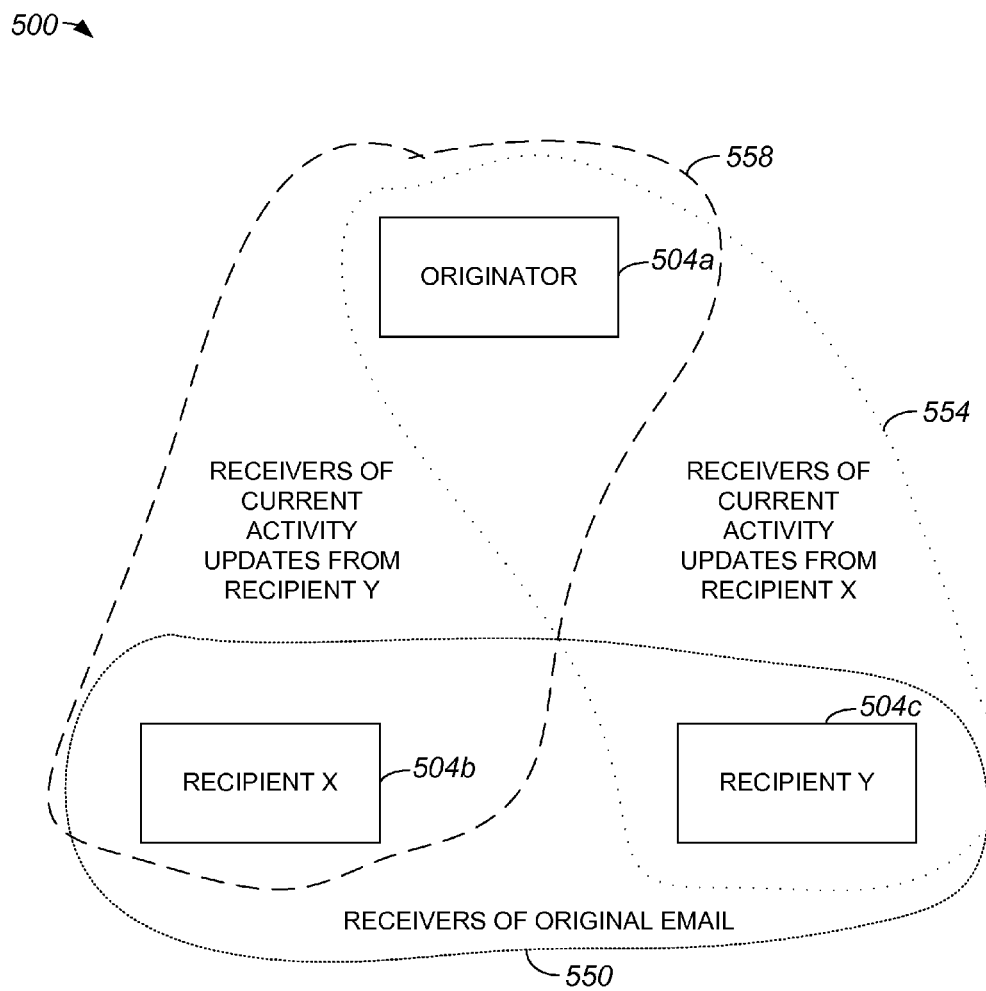
FIG. 5 is a diagrammatic representation of interactions within an enterprise that supports user interaction based presence in accordance with an embodiment of the present invention.

FIG. 5 is a diagrammatic representation of interactions within an enterprise that supports user interaction based presence in accordance with an embodiment of the present invention. With an enterprise 100, an originator 504 may send an original email to a set of receivers 550 which includes recipient 'X' 504b and recipient 'Y' 504c. In the described embodiment, originator 504a may elect to receive current activity updates, or user interaction based presence information, from each recipient 504b, 504c in set of receivers 550. It should be appreciated, however, that originator 504a may elect to receive current activity updates from selected recipients 504b, 504c, and not substantially all recipients 504b, 504c, in set of receivers 550. For example, originator 504a may elect to receive current activity updates from substantially only those recipients 504b, 504c in set of receivers 550 which are identified as being relatively important.

When recipient 'X' 504b has a user interaction with the original email, recipient 'X' 504b provides a current activity update to a set of receivers 554 which includes originator 504a and recipient 'Y' 504c. Similarly, when recipient 'Y' 504c has a user interaction with the original email, a current activity update is provided to a set of receivers 558 that includes originator 504a and recipient 'X' 504b.

Although only a few embodiments of the present invention have been described, it should be understood that the present invention may be embodied in many other specific forms without departing from the spirit or the scope of the present invention. By way of example, a user may specify a subset of recipients from whom current activity updates are desired. In other words, current activity updates or user interaction information may be requested from a subset of substantially all recipients of an email in lieu of being requested from substantially all recipients of the request. If some recipients are determined to be central or critical, and other recipients are determined to be peripheral or not critical, user interaction information may be requested from substantially only those recipients that are considered to be central or critical.

An activity update or a presence notification has generally been described as being provided by a recipient of an email to an originator of the email, as well as to other recipients of the email. In one embodiment, such an activity update or presence notification may be provided to substantially all recipients of the email, including the recipient with which the activity update is associated. That is, when an email recipient interacts with the received email and, thus, causes an activity update to be generated, that email recipient may also effectively provide the activity update to itself.

An email originator may generally obtain presence notifications for substantially all activities pertaining to an email. It should be appreciated, however, that an email originator may limit the number of presence notifications it obtains. For instance, an email originator may specify that presence notifications are obtained from substantially only those activities which are associated with a direct recipient of the email. If, for example, a direct recipient forward an email to another party, the originator of the email may receive a presence notification which indicates that the direct recipient forwarded the email, but may not receive any presence notifications relating to current activities of the party to which the email was forwarded without departing from the spirit or the scope of the present invention.

When an email system determines whether an email is being read, the email system may incorporate a timer into a determination of whether the email is being read, or whether the email is being scanned. By way of example, the email system may determine that if an email has been scrolled through, or has otherwise had all of its contents displayed in a display window, in less than a particular amount of time, then the email has been scanned but not read. On the other hand, if the email has been substantially completely displayed in greater than a particular amount of time, the email may be identified as having been read through in detail. In general, by monitoring how much of an opened email has been displayed in a display window associated with an email system, a determination may be made regarding how much of the email a viewer or user has likely read.

A determination of how much of an email has been read may be made periodically without departing from the spirit or the scope of the present invention. That is, an email system may be configured to determine how much of an email, e.g., an email that is currently open or displayed, has been read at predetermined time intervals.

In one embodiment, a response to an email that is effectively in the process of being prepared is considered to be a response substantially only when the "to" field of the response is populated. As such, even if a draft response is intended to respond to a particular email, that response may not be considered to be a state change associated with the email or a current activity associated with the email unless the "to" field of the draft response is populated with at least one appropriate address, e.g., the address of the originator of the email.

While email-based interaction information may be provided by a first email client to a second email client when the first email client identifies a state change, e.g., identifies when a reply has been initiated or when a draft of a reply has been aborted, email-based interaction information may be provided at substantially any time. For instance, an email client may periodically provide updates regarding the current activity surrounding particular emails. In other words, updates regarding current activity surrounding an email are not limited to being sent when state changes occur.

Substantially all replies to an email, or other correspondence which results from the email, may be threaded into a conversation. Threading an email and substantially all associated responses into a conversation allows a user, e.g., an originator of the email or a recipient of the email, to manage his email inbox. Gathered email presence information may be used to enable a user to relatively quickly view or otherwise obtain information relating to current activity relating to the email. In one embodiment, a user may use the presence information to identify which response in a conversation another user is currently acting upon.

A recipient of an email may elect to send a reply to certain parties while excluding other parties. That is, when an original email is received by a group of recipients, one of the recipients may reply to the original email by sending a reply to some but not the entire group of recipients. Such a recipient may notify those who are not receiving the reply that a reply has been sent to other recipients. In other words, parties who are not receiving a reply may receive a notification that a reply has been sent. It should be appreciated, however, that someone sending a reply to some parties and not other parties may not wish for those other parties to be aware that the reply has been sent. If such is the case, a notification that a reply has been sent is not created and sent.

When a respondent replies to an email sent by an originator, the originator may receive both the reply and a notification that the reply has been sent. Alternatively, as an email client of the originator is arranged to substantially warn the originator that the reply has been received, a notification that the reply may be considered to be optional and, as a result, may not necessarily be provided to the originator.

The present invention may be implemented such that responses which are being actively prepared by one party may be viewed by other parties. By way of example, an email originator may view an active response to an email as the active response is being prepared by a recipient. An email system of the present invention may also be configured to enable an instant messaging session, a conferencing session, and/or a telephone call to be created for multiple users, or email recipients, who are currently replying to the same email thread.

In one embodiment, an email recipient may elect not to provide user interaction based presence information, or may elect to provide substantially only select types of user interaction based presence information. That is, an email recipient may control the distribution of user interaction based presence information. For instance, an email recipient may elect to provide user interaction based presence information to substantially only email originators that are identified as trusted, or may elect not to provide user interaction based presence information to anybody.

The logic which provides functionality associated with the present invention may generally include hardware logic, software logic, or a combination of both hardware and software logic. Software logic may generally be encoded on a tangible media, and is operable to perform the various methods and steps associated with the present invention when executed.

The steps associated with the methods of the present invention may vary widely. Steps may be added, removed, altered, combined, and reordered without departing from the spirit of the scope of the present invention. Therefore, the present examples are to be considered as illustrative and not restrictive, and the invention is not to be limited to the details given herein, but may be modified within the scope of the appended claims.

What is claimed is:

1. A method comprising:
sending an email to at least a first recipient;
obtaining a presence notification from the first recipient, the presence notification being arranged to identify a user interaction based presence associated with the first recipient with respect to the email, wherein obtaining the presence notification includes receiving a message that includes the presence notification and identifying the presence notification, wherein identifying the presence notification includes identifying a presence line type in the message; and
presenting information associated with the user interaction based presence, wherein the message is an email message and the presence line type in the message indicates that the message is to be processed as a presence notification and not as a standard email message.

2. An apparatus comprising:
a processor;
at least one input/output port, the at least one input/output port being configured to enable the apparatus to communicate across a network; and
an email arrangement, the email arrangement including instructions embodied on a computer-readable medium and arranged to be executed by the processor, the instructions arranged to cooperate with the at least one input/output port to send and to receive emails, wherein the instructions include presence logic, the presence logic being arranged to monitor user interaction based presence with respect to a first email, and wherein the email arrangement is arranged to create and to send the first email using the at least one input/output port to at least a first recipient, and the presence logic is arranged to receive a presence notification via the at least one input/output port, the presence notification being arranged to identify the user interaction based presence associated with the first recipient, the user interaction based presence is a current activity of the first recipient with respect to the first email, wherein the current activity is one selected from the group including drafting a response to the first email, forwarding the first email, and closing the first email after reading the first email, wherein the presence logic is arranged to generate and to send a presence notification which identifies a state change associated with the first email using the network arrangement, and wherein the presence notification is a message, the message including a presence line type arranged to indicate that the message is to be processed as a presence notification and not as a standard email message.

3. The apparatus of claim 2 wherein the first email is received from an originator, and the presence notification is provided to at least the originator.

4. The method of claim 1 wherein presenting the information associated with the user interaction based presence includes displaying the information.

5. The method of claim 1 further including:
logging the information in an archive associated with the email.

6. The method of claim 1 further including:
determining whether to track the user interaction based presence of the first recipient.

7. The method of claim 1 wherein presenting the information associated with the user interaction based presence includes displaying the information associated with the user interaction based presence, and wherein the information associated with the user interaction based presence includes information relating to current activity associated with the message.

8. The method of claim 1 further including:
processing the presence notification, wherein processing the presence notification includes preventing the message from being placed in an email inbox.

9. One or more tangible non-transitory, computer-readable media comprising instructions stored thereon that, when executed on a processor, are operable to:
  send an email to at least a first recipient;
  obtain a presence notification from the first recipient, the presence notification being arranged to identify a user interaction based presence associated with the first recipient with respect to the email, wherein the logic operable to obtain the presence notification is further operable to receive a message that includes the presence notification and to identify the presence notification, wherein the logic operable to identify the presence notification is further operable to identify a presence line type in the message; and
  present information associated with the user interaction based presence, wherein the message is an email message and the presence line type in the message indicates that the message is to be processed as a presence notification and not as a standard email message.

10. The one or more tangible non-transitory, computer-readable media of claim 9 wherein the instructions are further operable to log the information in an archive associated with the email.

11. The one or more tangible non-transitory, computer-readable media of claim 10 wherein the instructions are further operable to determine whether to track the user interaction based presence of the first recipient.

* * * * *